United States Patent [19]
Aritsuka et al.

[11] Patent Number: 4,933,158
[45] Date of Patent: Jun. 12, 1990

[54] METHOD FOR PURIFYING NITROGEN TRIFLUORIDE GAS

[75] Inventors: Makoto Aritsuka; Naruyuki Iwanaga, both of Yamaguchi, Japan

[73] Assignees: Mitsui Toatsu Chemicals, Incorporated, Tokyo, Japan;

[21] Appl. No.: 425,957

[22] Filed: Oct. 24, 1989

[30] Foreign Application Priority Data

Oct. 25, 1988 [JP] Japan .................... 63-267058

[51] Int. Cl.$^5$ .................... C01B 21/06
[52] U.S. Cl. .................... 423/210; 423/230; 423/236; 423/239; 423/406; 423/240
[58] Field of Search ........... 423/210, 230, 236, 239, 423/240 S, 406

[56] References Cited

U.S. PATENT DOCUMENTS

| | | | |
|---|---|---|---|
| 3,235,474 | 2/1966 | Tompkins et al. | 423/406 |
| 3,356,454 | 12/1967 | Tompkins et al. | 423/408 |
| 4,156,598 | 5/1979 | Woytek et al. | 55/68 |
| 4,193,976 | 3/1980 | Lileck et al. | 423/406 |

FOREIGN PATENT DOCUMENTS

| | | | |
|---|---|---|---|
| 287424 | 12/1986 | Japan | 423/240 S |
| 151608 | 6/1988 | Japan | 423/406 |
| 1395211 | 5/1975 | United Kingdom | 423/240 S |

Primary Examiner—John Doll
Assistant Examiner—Wayne A. Langel
Attorney, Agent, or Firm—Fisher, Christen & Sabol

[57] ABSTRACT

There is here disclosed a method for removing nitrous oxide ($N_2O$), carbon dioxide ($CO_2$) and dinitrogen difluoride ($N_2F_2$) from a nitrogen trifluoride gas. The present invention is directed to a method for purifying a nitrogen trifluoride gas which comprises the steps of thermally treating, at a temperature of 250° to 700° C., a zeolite selected from the group consisting of analcime, clinoptilolite, mordenite, ferrierite, phillipsite, chabazite, erionite and laumotite; forming a packed bed of the treated zeolite; and passing the nitrogen trifluoride gas containing the gaseous impurities at a temperature of −125° to 50° C. through the filler layer.

5 Claims, No Drawings

METHOD FOR PURIFYING NITROGEN TRIFLUORIDE GAS

BACKGROUND OF THE INVENTION (i) Field of the Invention

The present invention relates to a method for purifying a nitrogen trifluoride gas. More particularly, it relates to a method for removing nitrous oxide ($N_2O$), carbon dioxide ($CO_2$) and dinitrogen difluoride ($N_2F_2$) from a nitrogen trifluoride gas.

(ii) Description of the Prior Art

In recent year, a nitrogen trifluoride ($NF_3$) gas attracts much attention as an etching agent for semiconductors and as a cleaning gas for CVD apparatus. The $NF_3$ gas used in these applications is required to be of high-purity.

The $NF_3$ gas can be prepared by various methods. For example, there are a process in which a molten salt of ammonium acid fluoride is electrolyzed, a process comprising the step of reacting gaseous fluorine with molten ammonium acid fluoride, a process in which fluorine in an elemental state is reacted with an ammonium complex of a solid metal fluoride, and a molten salt electrolysis process in a $NH_4F \cdot HF$ system or $KF \cdot NH_4F \cdot HF$ system which are obtained from ammonium fluoride or acidic ammonium fluoride and hydrogen fluoride as well as potassium fluoride or acidic potassium fluoride. However, in most cases of the above-mentioned methods, the obtained gas contains impurities such as $N_2O$, $CO_2$ and $N_2F_2$ in relatively large amounts, and therefore purification is necessary, if the high-purity $NF_3$ gas for the above-mentioned applications is desired.

A well known purification method for removing these impurities from the $NF_3$ gas, which has been heretofore used, is a process for adsorbing/removing the impurities therefrom gas by the use of an adsorbent such as a synthetic zeolite, active carbon or active alumina.

In particular, the synthetic zeolite disclosed in U.S. Pat. No. 4,156,598 can adsorb the above-mentioned impurities efficiently, and thus the disclosed adsorbent is considered to be satisfactory to some extent. However, according to the discoveries of the present inventors, the synthetic zeolite, for example, Molecular Sieve 5A has the problem that its ability to adsorb $N_2O$ is great, but its adsorbability to $CO_2$ is poor. In the case of Molecular Sieve 13X, inversely its ability to adsorb $CO_2$ is great, but its adsorbability to $N_2O$ is poor. In short, the ability of the synthetic zeolite to adsorb the impurities depends upon a kind of synthetic zeolite itself.

Accordingly, the inventors of the present case have found that when an attempt is made to remove the abovementioned impurities by adsorbing, two or more kind of synthetic zeolites must be used simultaneously, which is troublesome and uneconomical.

In addition, it has been also found that the synthetic zeolite adsorbs not only the impurities but also $NF_3$ which is the product, with the result that a great deal of the $NF_3$ gas is lost very inconveniently.

On the other hand, when active carbon or active alumina is used as the adsorbent, the adsorption of the impurities per unit volume of such a kind of adsorbent is weaker than when the synthetic zeolite is used, though the adsorption of $NF_3$ is also relatively weak. Therefore, the adsorbability of the active carbon or active alumina goes away in an extremely short period of time.

In consequence, the renewal or recovery of the adsorbent must often be made, and at the time of this renewal or recovery, the $NF_3$ gas is lost. After all, not a little volume of the $NF_3$ gas is lost on the whole. This problem has also been found by the present inventors.

Moreover, in purifying the $NF_3$ gas, it requires much labor and much time to often replace or regenerate the adsorbent.

It means that purifying capacity is substantially lowered.

In view of such situations, the present inventors have intensively conducted researches on techniques for removing $N_2O$, $CO_2$ and $N_2F_2$ from the $NF_3$ gas, and as a result, it has been found that when the $NF_3$ gas having a specific temperature is passed through the natural zeolite packed bed which has been beforehand thermally treated at a specific temperature, a less amount of $NF_3$ is merely adsorbed by the natural zeolite, and the above-mentioned impurities can be removed efficiently and economically from the $NF_2$ gas, since the natural zeolite has a high adsorbability to $N_2O$, $CO_2$ and $N_2F_2$. On the bases of this knowledge, the present invention has been achieved.

SUMMARY OF THE INVENTION

According to the present invention, there is provided a method for purifying a nitrogen trifluoride gas which comprises the steps of thermally treating, at a temperature of 250° to 700° C., a natural zeolite selected from the group consisting of analcime, clinoptilolite, mordenite, ferrierite, phillipsite, chabazite, erionite and laumonitite; forming a packed bed of the treated zeolite; and passing the nitrogen trifluoride gas containing gaseous impurities at a temperature of −125° to 50° C. through the packed bed.

DESCRIPTION OF THE PREFERRED EMBODIMENTS

The present invention will be described in detail.

Mineralogically, there are various kinds of natural zeolites, and any kind of natural zeolite can be used in the present invention without any particular limitation. However, from the viewpoints of rich reserves and an inexpensive mining cost, the preferable natural zeolites are analcime (or analcine), clinoptilolite, mordenite, ferrierite, phillipsite, chabazite, erionite and laumontite.

Above all, clinoptilolite [$Na_6\{(AlO_2)_6(SiO_2)_{30}\} \cdot 24 H_2O$] and mordenite [$Na_8\{(AlO_2)_8(SiO_2)_{40}\} \cdot 24 H_2O$] are particularly preferred, because they are of an Na type and they can largely adsorb impurities in an $NF_3$ gas per unit volume of the adsorbent.

Other equivalent examples of the usable natural zeolite used in the present invention include harmotome, gismondine, garronite, levyne, faujasite, scolesite, thomsonite, edingtonite, dachiardite, epistilbite, heulandite, stilbite, barrerite, cowlesite, wairakite, ashcrofine, merlinote, amicite, paulingite, yugawaralite, offretite, mazzite, gmelinite, natrolite, mesolite, gonnardite, bikitite, stellerite, brewsterite and pollucite.

These natural zeolites are minerals produced in sedimentary rock. In order to utilize this kind of zeolite as an adsorbent in the present invention, the rock-like natural zeolite is preferably ground to a suitable grain size, for example, 4 to 100 mesh, preferably 8 to 60 mesh.

In the present invention, the thus ground natural zeolite having a predetermined grain size distribution is then thermally treated at a temperature of 250° to 700° C., preferably 250° to 500° C.

It should be noted that only when the zeolite is thermally treated in the above-defined temperature range, the adsorbent can be obtained which has adsorbability high enough to achieve the object of the present invention.

If the thermal treatment temperature is less than this level, any satisfactory effect cannot be obtained. Because even if the zeolite is thermally treated for a long period of time at a temperature lower than the above-mentioned level, the adsorbability of the thus treated zeolite deteriorates soon after the commencement of operation, and a breakthrough time of the gas through the zeolite packed bed is noticeably curtailed, so that contents of impurities such as $N_2O$, $CO_2$ and $N_2F_2$ in the passed $NF_3$ gas increase greatly. The definition of a breakthrough time will be explained in the example later.

This reason is not necessarily apparent, but the following mechanism can be presumed: In the case that the natural zeolite containing crystal water is used as the adsorbent in the present invention, the crystal water (hereinafter referred to as "moisture") remains in the adsorbent itself, and as a result, when the $NF_3$ gas is passed through this natural zeolite packed bed, its ability to remove $N_2O$, $CO_2$ and $N_2F_2$ per unit volume of the zeolite declines. Therefore, it is necessary that the thermal treatment is carried out at the above-mentioned temperature so as to completely eliminate the moisture from the natural zeolite.

On the contrary, if the zeolite is heated at a temperature higher than the above-mentioned range, the crystalline structure of the natural zeolite changes or breaks down, so that it becomes an amorphous state. As a result, the absorability of the zeolite is noticeably impaired, with the result that no adsorption is accomplished or the breakthrough time of zeolite packed bed is reached soon after the beginning of the gas feed.

The thermal treatment of the natural zeolite is preferably carried out in a substantially moisture-free inert gas stream of nitrogen, helium, neon, argon, krypton or xenon. Alternatively, this treatment may be performed in a dry air from which $CO_2$ has been previously removed. Furthermore, the treatment may be carried out while these gases are sucked.

The thermal treatment is performed at the abovementioned heating temperature in the gas stream atmosphere for 10 minutes to 80 hours, preferably 1 hour to 40 hours, more preferably 3 hours to 10 hours.

The procedure of the thermal treatment is as follows: The natural zeolite powder having the desired grain diameter distribution is spread in the form of a thin layer in a drying container, and the zeolite powder is then heated while the inert gas is allowed to stream on the surface of the thin powder layer, or alternatively in a better case, a packed bed is formed of the zeolite, and while the inert gas is passed through the packed bed, the latter is heated.

Afterward, the thus thermally treated natural zeolite is allowed to stand or is forced to cool itself to a temperature of 50° C. or less for the sake of the subsequent absorption treatment. It is preferable to keep the moisture from getting into the zeolite in the cooling step.

In the present invention, a purifying treatment is carried out as follows: The packed bed is made of the thus thermally treated zeolite, and the nitrogen trifluoride gas containing the gaseous impurities is then passed through the packed bed, with the temperature of the nitrogen trifluoride gas being from −125° to 50° C.

In the best embodiment of the present invention, the thermal treatment of the natural zeolite and the absorption/purification of the $NF_3$ gas are performed in the same container. That is, the suitable container or column is packed with the ground natural zeolite having the desired grain size distribution, thereby forming the packed bed. Next, the zeolite is thermally treated, while the inert gas is passed through the packed bed. After the thermal treatment, the zeolite is preferably cooled without taking out itself from the container, and the $NF_3$ gas at −125° to 50° C. is successively passed through the packed bed of the natural zeolite.

The purification of the $NF_3$ gas is carried out by passing this gas through the zeolite packed bed in the container or column, but at this time, the temperature of the $NF_3$ gas which is being passed therethrough is preferably 50° C. or less. If the gas temperature is in excess of this temperature level, the contents of $N_2O$, $CO_2$ and $N_2F_2$ in the purified $NF_3$ gas are high, and adsorptions of $N_2O$, $CO_2$ and $N_2F_2$ per unit volume of the natural zeolite noticeably decrease inconveniently.

The lower the gas temperature is, the better, but since the boiling point of $NF_3$ is −129° C., it is actually difficult to perform the operation at a temperature less than this level. Therefore, the purification is made in the abovementioned temperature range of −125° C. or more.

Examples of the usable material for the container or column include stainless steel, copper, nickel and iron which can be used usually. Since iron is liable to corrode while always exposed to air, anti-corrosion treatment is preferably given thereto.

Reference will be made in detail to conditions for the purification through the zeolite packed bed as follows:

The diameter of the zeolite packed bed is preferably from about 1 cm to about 1 m$\phi$. When desired, a plurality of the packed columns having a small diameter may be bundled, and the bundled columns may be then employed. If the diameter of packed bed is more than 50 cm, a heat transfer fin is preferably disposed on the surface of the column and/or a heat exchanger is preferably inserted into the packed bed so as to efficiently remove adsorption heat generated at the time of the gas feed. The height of the packed bed is in the range of about 10 cm to about 3 m, and the flow rate of the $NF_3$ gas is in the range of about 10 cc/minute to about 100 liter/minute. In this connection, the requirements of the packed bed diameter, the packed bed height and the gas flow rate can be optionally combined on condition that the linear velocity of the gas is in the range of 1 to 500 cm/minute, preferably 1 to 200 cm/minute.

The pressure of the $NF_3$ gas at the time of the gas feed is not particularly restrictive, but for example, the range of about 0 to about 5 kg/cm$^2$G, in which the operation is easy, is preferable.

With regard to approximate contents of the gaseous impurities present in the $NF_3$ gas which is the target of the present invention, the content of $N_2O$ is 0.1–2.0%, that of $CO_2$ is 0.3–2.0% and that of $N_2F_2$ is 0.2–0.6%, and it is required that after the purification treatment, the amount of each component is less than 10 ppm. The purification treatment of the present invention enables the amounts of the gaseous impurities in the $NF_3$ gas to decrease to ND-5 ppm of $N_2O$, ND-5 ppm of $CO_2$ and ND-5 ppm of $N_2F_2$. In this case, these values are what are obtained in accordance with an analytical method by the use of gas chromatography (detector PID), and the above-mentioned ND means that the amount of the component to be analyzed is less than a detection limit (less than 1 ppm).

EXAMPLE

The present invention will be described in detail in reference to examples, but it should be clearly understood that these examples are for the purpose of better comprehension of the present invention and do not intend to limit its scope.

In the following examples, percent and ppm are based on volume, unless otherwise specified.

In the examples and comparative examples, a breakthrough time means the following period of time: When a gas containing impurities is passed through an adsorbent layer to adsorb and remove the impurities from the gas, contents of the impurities in the purified are low immediately after the commencement of gas feed, and afterward their contents are constant or change with slightly incremental tendencies. In the vicinity of the time when the adsorbability of the adsorbent is lost, the contents of the impurities in the purified gas increase abruptly. The period from the start of the gas feed to the abrupt increase of the impurity contents is called the breakthrough time. In the examples and comparative examples except for Comparative Examples 1 to 4, the breakthrough time is a gas feed time of from the start of the gas feed to a point when any one of $N_2O$, $CO_2$ and $N_2F_2$ is an $NF_3$ gas is in excess of 10 ppm. In Comparative Examples 1 to 4, the breakthrough time is a gas feed time from the start of the gas feed to a point when any one of the above-mentioned impurities is in excess of 20 ppm.

EXAMPLES 1 TO 4

A stainless steel column having an inner diameter of 10 mm was filled with natural zeolite (mordenite) grains having a grain diameter of 24 to 48 mesh (height of the packed bed of zeolite in the column 200 mm), and the mordenite zeolite was then thermally treated under conditions shown in Table 1. Afterward, the mordenite packed bed was cooled, and an $NF_3$ gas having analyzed values shown in Table 1 was then passed through the mordenite packed bed under conditions set forth in Table 1 for a period of breakthrough time.

The breakthrough time and amounts of $N_2O$, $CO_2$, $N_2F_2$ and $NF_3$ adsorbed during the breakthrough time are set forth in Table 1. When the purification is carried out in accordance with the method of the present invention, the amount of $NF_3$ lost by the adsorption is much less than when a molecular sieve which is one kind of synthetic zeolites is used, as understood from the comparison with undermentioned Comparative Examples 5 to 7, and $N_2O$, $CO_2$ and $N_2F_2$ can be removed very successfully from the $NF_3$ gas. Furthermore, comparing with cases where active carbon and active alumina are used, it is apparent that in these examples using the natural mordenite, the breakthrough time is much longer and the loss of $NF_3$ by the adsorption is far smaller.

In these examples, the $NF_3$ gas was analyzed by gas chromatography (the same shall apply hereinafter).

EXAMPLES 5 TO 8

Following the same procedure as in Examples 1 to 4 with the exception that clinoptilolite having a grain diameter of 24 to 48 mesh was used as a natural zeolite, the clinoptilolite was thermally treated, and an $NF_3$ gas was then purified by passing this gas through the natural zeolite packed bed under conditions shown in Table 2 for a breakthrough time (the amount of clinoptilolite with which the stainless steel column was packed was the same as in Examples 1 to 4).

The results are set forth in Table 2. These results indicate that the amount of $NF_3$ lost by the adsorption is small as in Examples 1 to 4, that $N_2O$, $CO_2$ and $N_2F_2$ are very successfully removed from the $NF_3$ gas, and that the breakthrough time is prolonged.

COMPARATIVE EXAMPLES 1 TO 4

Following the same procedure as in Examples 1 to 4 with the exception that each natural zeolite having a grain diameter of 24 to 48 mesh shown in Table 3 was used, the natural zeolite was thermally treated, and an $NF_3$ gas was then purified by passing this gas through the natural zeolite packed bed under conditions shown in Table 3 for a breakthrough time (the amount of natural zeolite with which the stainless steel column was packed was the same as in Examples 1 to 4).

The results are set forth in Table 3. These results indicate that when each natural zeolite thermally treated at a temperature less than the specific conditions of the present invention is employed as in Comparative Examples 1 and 2, the adsorbability of the natural zeolite is poor, the breakthrough time is noticeably shortened, and contents of the impurities in the purified $NF_3$ gas increase inconveniently, even though thermally treatment time is extended.

Furthermore, when the feed temperature of the $NF_3$ gas which is passed through the natural zeolite packed bed is higher than the specified temperature of the present invention as in Comparative Examples 3 and 4, the breakthrough time is shortened, though it is not so noticeable as in Comparative Examples 1 and 2, and the contents of the impurities in the purified $NF_3$ gas increase inconveniently.

COMPARATIVE EXAMPLES 5 AND 6

The same procedure as in Comparative Examples 1 and 2 was repeated with the exception that the temperature of the thermal treatment was 800° C.

The results are set forth in Table 3. These results indicate that when each natural zeolite which has been thermally treated at a temperature higher than the specific conditions of the present invention is employed as in Comparative Examples 5 and 6, the adsorbability of the natural zeolite is very poor, probably because the crystalline structure of the natural zeolite is broken down, with the result that a breakthrough time is as short as less than 5 minutes, which means that such a natural zeolite is not industrially practicable. In addition, it is apparent from the results that impurities are scarcely adsorbed during the breakthrough time.

COMPARATIVE EXAMPLES 7 TO 9

According to the same procedure as in Examples 1 to 4 with the exception that a natural zeolite as an adsorbent was replaced with a mixture of Molecular Sieve 5A and Molecular Sieve 13X, which were synthetic zeolites, in a volume ratio of 1:1 (Comparative Example 7), active carbon (Comparative Example 8) and active alumina (Comparative Example 9), each adsorbent was thermally treated, and an $NF_3$ gas was purified by passing this gas through each treated adsorbent under conditions shown in Table 4 for a breakthrough time (the amount of each synthetic zeolite with which the stainless steel column was packed was the same as in Examples 1 to 4).

The results are set forth in Table 4. These results indicate that when the molecular sieves are used as the adsorbents, the loss of $NF_3$ by the adsorption is great.

In the case that the active carbon and active alumina are used, the ability to adsorb impurities is low, and so a breakthrough time is short. Furthermore, the loss of $NF_3$ by the adsorption is greater than when the natural zeolite regarding the present invention is used.

As described above, the present invention is connected with an extremely simple method for removing $N_2O$, $CO_2$ and $N_2F_2$ from an $NF_3$ gas by the use of an adsorbent which comprises the steps of thermally treating an inexpensive natural zeolite as the adsorbent at a specified temperature, and then passing the $NF_3$ gas through the natural zeolite packed bed.

In conventional methods using synthetic zeolites, the adsorption of $NF_3$ is great, which means that the loss of expensive $NF_3$ by the adsorption is great. In addition, when the above-mentioned impurities are removed, two or more kinds of synthetic zeolites must be used together.

Moreover, when the adsorbent is active carbon or active alumina, the adsorption of $NF_3$ is small, but the ability to adsorb the impurities is poor. Therefore, a breakthrough time is short and the renewal or recovery of the adsorbent must often be carried out inconveniently.

On the contrary, in the method of the present invention using the natural zeolite, $N_2O$, $CO_2$ and $N_2F_2$ can be adsorbed in large quantities, and the loss of $NF_3$ by the adsorption is much smaller than in the method using the synthetic zeolite.

Furthermore, as compared with the method using active carbon or active alumina, the loss of $NF_3$ in the present invention is also smaller.

As discussed above, according to the method of the present invention, $N_2O$, $CO_2$ and $N_2F_2$ can be efficiently and economically removed from the $NF_3$ gas, and what is better, the loss of expensive $NF_3$ is very small. In consequence, the industrial applicability of the present invention is very great.

TABLE 1

| Example | 1 | 2 | 3 | 4 |
|---|---|---|---|---|
| Natural Zeolite | mordenite | mordenite | mordenite | mordenite |
| Thermal Treatment Conditions | | | | |
| Temp. (°C.) | 250 | 350 | 350 | 450 |

TABLE 1-continued

| Example | 1 | 2 | 3 | 4 |
|---|---|---|---|---|
| Time (h) | 4 | 4 | 4 | 4 |
| Atmosphere | $N_2$ gas | $N_2$ gas | $N_2$ gas | $N_2$ gas |
| Pressure | atm. | atm. | atm. | atm. |
| Gas Feed Conditions | | | | |
| Gas Temp. (°C.) | 0 | 0 | 25 | 0 |
| $NF_3$ Gas Flow Rate (Nml/min.) | 25 | 25 | 25 | 25 |
| Gas Feed Pressure | atm. | atm. | atm. | atm. |
| Analyzed Values of Gas before Gas Feed | | | | |
| $NF_3$ (%) | 96.17 | 96.17 | 96.17 | 96.17 |
| $N_2$ (%) | 1.52 | 1.52 | 1.52 | 1.52 |
| $N_2O$ (%) | 0.23 | 0.23 | 0.23 | 0.23 |
| $CO_2$ (%) | 1.77 | 1.77 | 1.77 | 1.77 |
| $N_2F_2$ (%) | 0.31 | 0.31 | 0.31 | 0.31 |
| Breakthrough Time (min.) | 336 | 363 | 272 | 370 |
| Adsorptions in Breakthrough Time | | | | |
| $N_2O$ (mg) | 38 | 41 | 31 | 42 |
| $CO_2$ (mg) | 292 | 315 | 236 | 322 |
| $N_2F_2$ (mg) | 77 | 83 | 62 | 84 |
| $NF_3$ (mg) | 14 | 16 | 11 | 17 |

Note: The term "atm." means atmospheric pressure.

TABLE 2

| Example | 5 | 6 | 7 | 8 |
|---|---|---|---|---|
| Natural Zeolite | clinoptilolite | clinoptilolite | clinoptilolite | clinoptilolite |
| Thermal Treatment Conditions | | | | |
| Temp. (°C.) | 250 | 350 | 350 | 450 |
| Time (h) | 4 | 4 | 4 | 4 |
| Atmosphere | $N_2$ gas | $N_2$ gas | $N_2$ gas | $N_2$ gas |
| Pressure | atm. | atm. | atm. | atm. |
| Gas Feed Conditions | | | | |
| Gas Temp. (°C.) | 0 | 0 | 25 | 0 |
| $NF_3$ Gas Flow Rate (Nml/min.) | 25 | 25 | 25 | 25 |
| Gas Feed Pressure | atm. | atm. | atm. | atm. |
| Analyzed Values of Gas before Gas Feed | | | | |
| $NF_3$ (%) | 96.17 | 96.17 | 96.17 | 96.17 |
| $N_2$ (%) | 1.52 | 1.52 | 1.52 | 1.52 |
| $N_2O$ (%) | 0.23 | 0.23 | 0.23 | 0.23 |
| $CO_2$ (%) | 1.77 | 1.77 | 1.77 | 1.77 |
| $N_2F_2$ (%) | 0.31 | 0.31 | 0.31 | 0.31 |
| Breakthrough Time (min.) | 325 | 345 | 258 | 351 |
| Adsorptions in Breakthrough Time | | | | |
| $N_2O$ (mg) | 37 | 39 | 29 | 40 |
| $CO_2$ (mg) | 282 | 300 | 224 | 305 |
| $N_2F_2$ (mg) | 74 | 79 | 59 | 80 |
| $NF_3$ (mg) | 17 | 20 | 12 | 21 |

Note: The term "atm." means atmospheric pressure.

TABLE 3

| | Comparative Example | | | | | |
|---|---|---|---|---|---|---|
| | 1 | 2 | 3 | 4 | 5 | 6 |
| Natural Zeolite | mordenite | clinoptilolite | mordenite | clinoptilolite | mordenite | clinoptilolite |
| Treatment Conditions | | | | | | |
| Temp. (°C.) | 190 | 190 | 350 | 350 | 800 | 800 |
| Time (h) | 8 | 8 | 4 | 4 | 8 | 8 |
| Atmosphere | $N_2$ gas | $N_2$ gas | $N_2$ gas | $N_2$ gas | $N_2$ gas | $N_2$ gas |
| Pressure | atm. | atm. | atm. | atm. | atm. | atm. |
| Gas Feed Conditions | | | | | | |
| Gas Temp. (°C.) | 0 | 0 | 70 | 70 | 0 | 0 |
| $NF_3$ Gas Flow Rate (Nml/min.) | 25 | 25 | 25 | 25 | 25 | 25 |
| Gas Feed Pressure | atm. | atm. | atm. | atm. | atm. | atm. |
| Analyzed Values of Gas before Gas Feed | | | | | | |
| $NF_3$ (%) | 96.17 | 96.17 | 96.17 | 96.17 | 96.17 | 96.17 |
| $N_2$ (%) | 1.52 | 1.52 | 1.52 | 1.52 | 1.52 | 1.52 |

TABLE 3-continued

| | Comparative Example | | | | | |
|---|---|---|---|---|---|---|
| | 1 | 2 | 3 | 4 | 5 | 6 |
| $N_2O$ (%) | 0.23 | 0.23 | 0.23 | 0.23 | 0.23 | 0.23 |
| $CO_2$ (%) | 1.77 | 1.77 | 1.77 | 1.77 | 1.77 | 1.77 |
| $N_2F_2$ (%) | 0.31 | 0.31 | 0.31 | 0.31 | 0.31 | 0.31 |
| Analyzed Values of Gas after Gas Feed | | | | | | |
| 5 min. after Start of Gas Feed | | | | | | |
| $N_2O$ (ppm) | 5 or less | 5 or less | 5 or less | 5 or less | 122 | 125 |
| $CO_2$ (ppm) | 5 or less | 5 or less | 5 or less | 5 or less | 75 | 61 |
| $N_2F_2$ (ppm) | 5 or less | 5 or less | 5 or less | 5 or less | 33 | 56 |
| 10 min. after Start of Gas Feed | | | | | | |
| $N_2O$ (ppm) | 17 | 15 | 14 | 15 | 850 | 920 |
| $CO_2$ (ppm) | 10 | 10 | 5 or less | 5 or less | 660 | 710 |
| $N_2F_2$ (ppm) | 10 | 12 | 5 or less | 5 or less | 610 | 725 |
| Breakthrough Time (min.) | 27 | 28 | 102 | 95 | <5 | <5 |
| Adsorptions in Breakthrough Time | | | | | | |
| $N_2O$ (mg) | 3 | 3 | 11 | 3 | <1 | <1 |
| $CO_2$ (mg) | 23 | 24 | 88 | 82 | <2 | <2 |
| $N_2F_2$ (mg) | 6 | 6 | 23 | 21 | <2 | <2 |
| $NF_3$ (mg) | 2 | 3 | 3 | 4 | <1 | <1 |

Note: The term "atm." means atmospheric pressure.

TABLE 4

| Comparative Example | 7 | 8 | 9 |
|---|---|---|---|
| Adsorbent | Molecular Sieves | Active Carbon | Active Alumina |
| Treatment Conditions | | | |
| Temp. (°C.) | 350 | 350 | 350 |
| Time (h) | 4 | 4 | 4 |
| Atmosphere | $N_2$ gas | $N_2$ gas | $N_2$ gas |
| Pressure | atm. | atm. | atm. |
| Gas Feed Conditions | | | |
| Gas Temp. (°C.) | 0 | 0 | −70 |
| $NF_3$ Gas Flow Rate (Nml/min.) | 25 | 25 | 25 |
| Gas Feed Pressure | atm. | atm. | atm. |
| Analyzed Values of Gas before Gas Feed | | | |
| $NF_3$ (%) | 96.17 | 96.17 | 96.17 |
| $N_2$ (%) | 1.52 | 1.52 | 1.52 |
| $N_2O$ (%) | 0.23 | 0.23 | 0.23 |
| $CO_2$ (%) | 1.77 | 1.77 | 1.77 |
| $N_2F_2$ (%) | 0.31 | 0.31 | 0.31 |
| Breakthrough Time (min.) | 221 | 104 | 115 |
| Adsorptions in Breakthrough Time | | | |
| $N_2O$ (mg) | 32 | 11 | 13 |
| $CO_2$ (mg) | 167 | 90 | 100 |
| $N_2F_2$ (mg) | 71 | 24 | 26 |
| $NF_3$ (mg) | 1130 | 240 | 189 |

Note: The term "atm." means atmospheric pressure.

What is claimed is:

1. A method for purifying a nitrogen trifluoride gas which comprises the steps of thermally treating, at a temperature of 250° to 700° C., a natural zeolite selected from the group consisting of analcime, clinoptilolite, mordenite, ferrierite, phillipsite, chabazite, erionite and laumontite; forming a packed bed of said treated zeolite; and passing said nitrogen trifluoride gas containing gaseous impurities at a temperature of −125° to 50° C. through said packed bed.

2. The method for purifying a nitrogen trifluoride gas according to claim 1 wherein said gaseous impurities in said nitrogen trifluoride gas are $N_2O$, $CO_2$ and $N_2F_2$.

3. The method for purifying a nitrogen trifluoride gas according to claim 1 wherein said thermal treatment of said zeolite is carried out for a period of 10 minutes to 80 hours.

4. The method for purifying a nitrogen trifluoride gas according to claim 1 wherein said thermal treatment of said zeolite is carried out while an inert gas is fed.

5. The method for purifying a nitrogen trifluoride gas according to claim 1 wherein said thermal treatment of said zeolite is carried out by heating said packed bed of said zeolite, and successively said nitrogen trifluoride gas containing said gaseous impurities is passed through said packed bed.

* * * * *